July 20, 1965   J. SAMPSON ETAL   3,195,504
RELEASERS
Filed Aug. 26, 1963
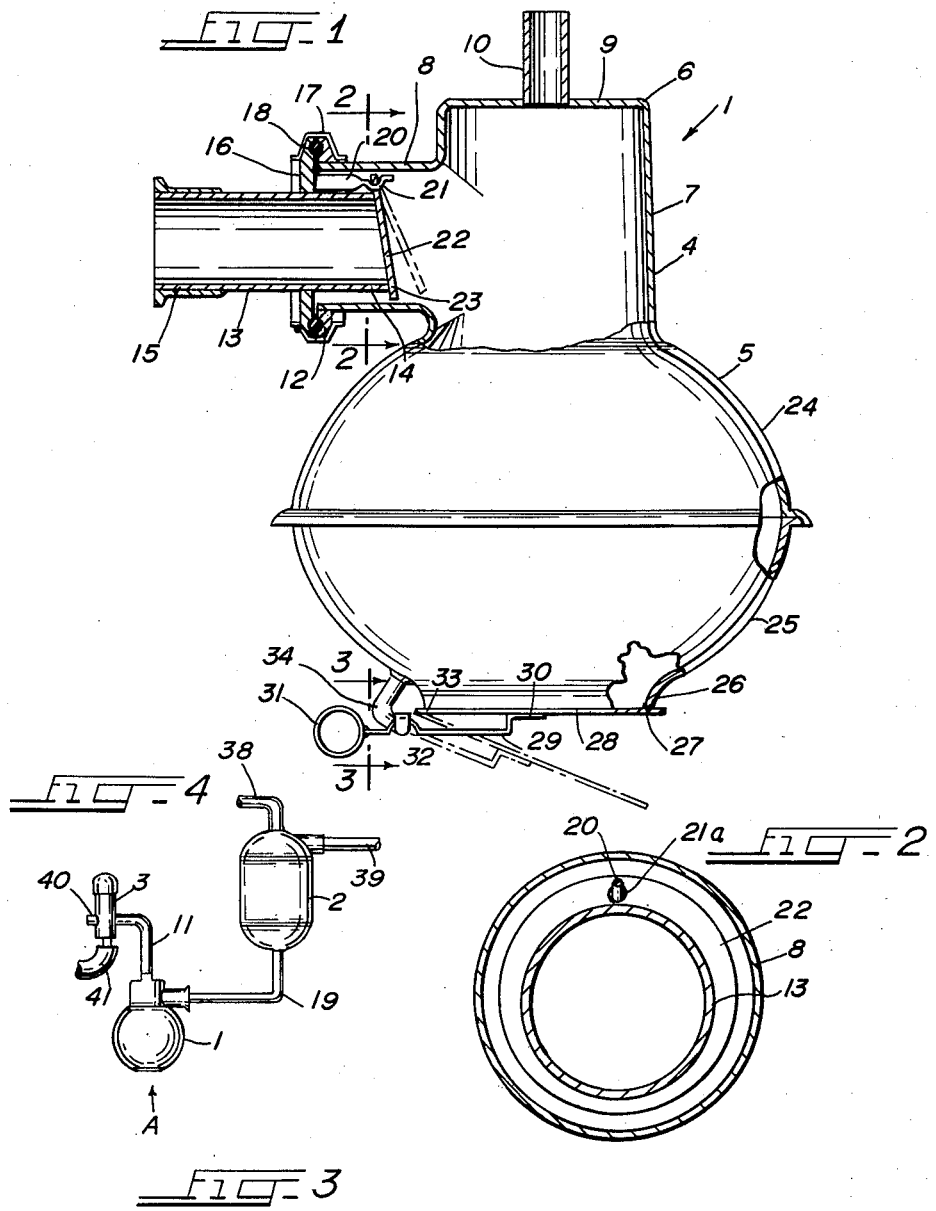
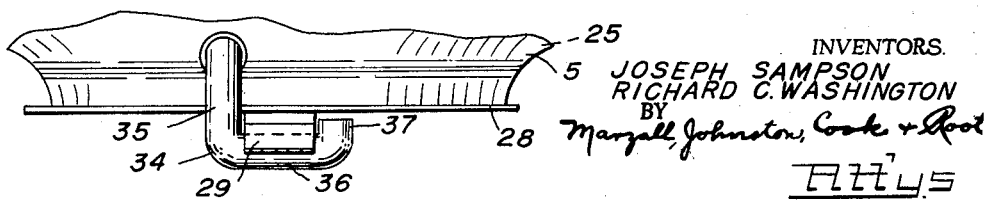
INVENTORS.
JOSEPH SAMPSON
RICHARD C. WASHINGTON
BY

United States Patent Office 3,195,504
Patented July 20, 1965

3,195,504
RELEASERS
Joseph Sampson, Tomahawk, and Richard C. Washington, Merrill, Wis., assignors to U.S. Industries, Inc., New York, N.Y., a corporation of Delaware
Filed Aug. 26, 1963, Ser. No. 304,565
8 Claims. (Cl. 119—14.07)

This invention relates to releasers, and, more particularly, to releasers which are particularly well adapted for use in permanent pipeline milking systems, and the like.

It is a primary object of the present invention to afford a novel releaser for receiving and discharging milk in a milking system.

In the so-called permanent pipeline milking systems used in dairy barns for simultaneously milking a plurality of cows, the individual milking machines for the various cows often operate off from a common vacuum line, and the milk taken from the cows is often fed through a common pipeline, which is under vacuum, to a milk-receiving station where it is all dumped into a common tank, or the like. Normally, it is desirable to maintain the vacuum in the milk line of such a system at all times during a milking operation. Releasers are commonly used in such pipelines so that milk may be fed into the releaser under vacuum, and dumped from the releaser while maintaining the remainder of the milk line under vacuum.

In such pipeline installations, space is often at a premium. This is especially true of vertical space because for one reason, the milk line normally slopes downwardly toward the milk-receiving station all the way from the cow disposed the furthest distance from the milk-receiving station. As will be appreciated, in a long dairy barn, this distance can be of considerable length. The maximum height of such a pipeline is controlled by various factors, such as, for example, the fact that it should be readily accessible to a person standing on the floor of the barn for making the various necessary connections and disconnections to and from the pipeline. Inasmuch as the maximum height of such a pipeline is thus limited, and the pipeline slopes downwardly all the way to the milk-receiving station, the vertical space available at the milk-receiving station for mounting a releaser, or the like, is often-times severely limited. It is an object of the present invention to afford a novel, practical and efficient releaser of relatively large capacity, which is sufficiently small in height to enable it to be mounted in such limited spaces.

For sanitation purposes, it is necessary that the various portions of such milking equipment, and, particularly, the portions which come in direct contact with the milk, be readily cleanable, and so constructed as to avoid contamination of the milk. It is an important object of the present invention to afford a novel releaser wherein the parts are so constituted and arranged that it may be readily cleaned.

Releasers for milking systems have been heretofore known in the art. However, such releasers as have been heretofore known in the art have had several inherent disadvantages such as, for example, not being readily cleanable throughout all portions thereof; being of too small milk capacity; being large and cumbersome in size; requiring a relatively large amount of vertical space for the proper mounting and connection thereof; being inefficient or unreliable in operation; or being difficult and expensive to produce commercially, and the like. It is an important object of the present invention to overcome such disadvantages.

In milking-handling equipment, and the like, such as, for example, in releasers of the aforementioned type, it is undesirable to have the milk come in contact with rubber because rubber tends to soak up and accumulate certain substances from the milk, and it is difficult to clean all such substances from rubber. Also, rubber members which require metal inserts, and the like, such as, for example, rubber valve members, often have small imperfections therein, such as, for example, minute indentations, or the like, which may afford traps for accumulating bacteria or other undesirable matter. It is an important object of the present invention to enable a novel milk releaser to be afforded wherein the milk flowing therethrough does not contact rubber parts.

Another object is to afford a novel releaser of the aforementioned type embodying all metal valves, which are constituted and arranged in a novel and expeditious manner.

A further object is to afford a novel releaser of the aforementioned type wherein the parts thereof are so constituted and arranged that, if desired, a man's hand may be inserted into the releaser for cleaning the same.

Another object is to provide a novel releaser of the aforementioned type which affords a minimum surface area which it is necessary to clean.

A further object is to afford a novel releaser of the aforementioned type wherein the parts are so constituted and arranged as to insure that when the releaser is being used in a permanent pipeline system or the like, milk, or milk spray will not be drawn from the releaser into the vacuum line of the system.

Another disadvantage commonly found in releasers for milk systems, and the like, milk, or milk spray will not be drawn from the releaser into the vacuum line of the system.

Another disadvantage commonly found in releasers for milk systems, and the like, heretofore known in the art, has been that they were so constituted and arranged that it was necessary to reevacuate a relatively large volume after each dumping of the releaser. It is another object of the present invention to afford a novel releaser wherein the parts thereof are so constituted and arranged that only a relatively small amount of volume above the milk level in the releaser must be evacuated.

A further object is to enable a relatively large milk capacity to be afforded in a novel and expeditious manner in a milk releaser of the aforementioned type.

Another object is to afford a novel releaser of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a side view, partially in side elevation, and partially in section, of a releaser embodying the principles of the present invention;

FIG. 2 is an enlarged detail sectional view taken substantially along the line 2—2 in FIG. 1;

FIG. 3 is an enlarged, fragmentary elevational view of a portion of the releaser shown in FIG. 1, looking in the direction of the arrows 3—3 in FIG. 1; and FIG. 4 is a somewhat diagrammatic view of a portion of a milking system, illustrating a typical installation of the releaser shown in FIG. 1.

A releaser 1, embodying the principles of the present invention, is shown in the drawings to illustrate the preferred embodiment of the present invention. In FIG. 4, the releaser 1 is shown operatively connected between a receiver 2 and a pulsator 3 in position to receive milk from the receiver 2, and to dump the thus received milk, as will be discussed in greater detail presently.

The releaser 1 includes a vessel 4 having a rounded body portion 5, which is substantially of a modified spheroidal shape, the body portion 5 being generally spheroidal in shape except that it has flat upper and lower ends. The vessel 4 also includes an upper end portion 6, which includes an upstanding, substantially cylindrical-shaped neck 7, and a substantially cylindrical-shaped inlet conduit 8 projecting horizontally outwardly from the neck 7 in downwardly spaced relation to the upper end or top wall 9 thereof. A tubular member or nipple 10 is mounted in the top wall 9 of the upper end portion 6 and projects upwardly therefrom to afford a connecting member for connecting the interior of the vessel 4 to a vacuum line, such as, a vacuum line 11, FIG. 4, for a purpose which will be discussed in greater detail presently.

The inlet conduit 8 has a radially outwardly projecting flange 12. An elongated, substantially straight tubular member 13 is mounted in the inlet conduit 8, one end portion 14 of the tubular member 13 projecting into the inlet conduit 8 and terminating short of the inner end thereof, and another end portion 15 of the tubular member 13 projecting outwardly from the inlet conduit 8. The tubular member 13 has a radially outwardly projecting flange 16 thereon between the end portions 14 and 15 thereof. When the tubular member 13 is disposed in operative position in the inlet conduit 8, the flange 16 is releasably secured to the flange 12 by suitable clamping means such as, for example, a clamping ring 17, FIG. 1. A gasket 18, made of suitable material such as, for example, rubber or neoprene is disposed between the flanges 12 and 16, in position to seal the connection therebetween against leakage of air or fluid therethrough. The tubular member 13 affords an inlet for feeding milk into the inlet conduit 8, and thus into the neck 7 and the body portion 5 of the vessel 4. In operation, the end portion 15 of the tubular member 13 may be connected to a suitable conduit for milk, such as, for example, one end of a milk line 19, the other end of which line is connected to the discharge outlet of the milk receiver 2, as shown in FIG. 4.

A mounting bracket 20 in the form of a hook is secured to the inner face of the flange 16 on the tubular member 13, and is disposed in such position that when the tubular member 13 is disposed in operative position in the inlet conduit 8, the hook shaped free end portion 21 thereof projects inwardly past the end portion 14 into position to suspendingly support a flapper valve 22, FIG. 1. The flapper valve 22 is in the form of a substantially flat round member made of suitable metal, such as, for example, stainless steel, and has an opening 21a in one peripheral edge portion thereof, spaced inwardly from the outer peripheral edge thereof, FIG. 2. The opening 21a is of such size that the hooked end portion 21 of the supporting bracket 20 may be readily inserted thereinto, and removed therefrom, and the mounting bracket 20 and the flapper valve 22 are so constituted and arranged that when the flapper valve 22 is disposed in operative position in the vessel 4 it depends from the mounting bracket 20 and extends downwardly therefrom across the inner end of the tubular member 13. The flapper valve 22 is pivotable on the mounting bracket 20 between a closed position wherein it extends across the inner end of the tubular member 13 in sealing engagement therewith, as shown in solid lines in FIG. 1, and an open position wherein it is disposed in spaced relation to the inner end of the tubular member 13, as shown in broken lines in FIG. 1. The inner end 23 of the tubular member 13 is flat, and is preferably lapped to afford a valve seat having a smooth flat surface. The inner end 23 of the tubular member 13 slopes into the vessel 4 at an acute angle in the nature of 15 degrees to the vertical from the top to the bottom thereof, so that when the flapper valve 22 is disposed in the aforementioned closed position relative to the valve seat 23, it is supported thereby and is urged by gravity into sealing engagement therewith.

The vessel 4 is preferably made of suitable metal such as, for example, stainless steel, and the body portion 5 thereof preferably embodies an upper section 24 and a lower section 25 sealed together by suitable means such as, welding, FIG. 1. The upper end portion 7 of the vessel 4, and the upper section 24 of the body portion 5 are preferably formed as a single unit.

The body portion 5 of the vessel 4 has a round opening 26 in the bottom thereof which is preferably of sufficient size, such as, for example, three and a half inches in diameter, to afford an opening through which an adult human hand may be inserted into the vessel 4 for the purpose of cleaning the interior thereof. The periphery of the opening 26 is defined by a downwardly facing, flat, smooth valve seat 27 adapted to be sealingly engaged by a flapper valve 28 for closing the opening 26.

The flapper valve 28 preferably comprises a substantially round, flat member made of suitable metal, such as, for example, stainless steel, and is preferably relatively thin, such as, for example, having a thickness of fifteen thousandths of an inch. With this construction, the flapper valve 28 has sufficient flexibility that when it is disposed in closed relation to the seat 27 it can accommodate itself to any slight imperfections in the seat 27 to thereby insure good sealing engagement therewith.

An elongated mounting arm 29 has one end 30 secured to the central portion of the lower face of the flapper valve 28, and the arm 29 projects outwardly of the flapper valve 28 in substantially parallel relation thereto. A counterbalance weight 31 is secured to the outwardly projecting free end portion 32 of the arm 29, and the arm 29 is bent to afford a downwardly opening recess 33 in the outer end portion 32 thereof inwardly of the weight 31, FIG. 1.

A substantially L-shaped supporting bracket 34, having two legs 35 and 36, projects downwardly from the body portion 5 of the vessel 4 for pivotally supporting the flapper valve 28. One end of the leg 35 is secured to the lower section 25 of the body portion 5 by suitable means, such as, for example, welding, and the leg 35 projects downwardly and outwardly therefrom at an acute angle to the vertical. The leg 36 of the mounting bracket 34 projects substantially horizontally from the other end of the leg 35 and terminates in an upwardly projecting free end portion 37, FIGS. 1 and 3. The arm 29 is pivotally mounted on, and supported by the leg 36, between the leg 35 and the free end portion 37, with the leg 36 disposed in the recess 33. The weight 31 is of such size, and is so disposed on the arm 29, that when the arm 29 is mounted in operative position on the mounting bracket 34, the weight 31 is effective to positively urge the flapper valve 28 toward seating engagement with the seat 27. The leg 36 of the mounting bracket 34 is so disposed relative to the body portion 5 of the vessel 4 that the entire flapper valve assembly, including the flapper valve 28, the arm 29, and the counterweight 31 may be quickly and easily mounted on and removed from the mounting bracket 34 by moving the arm 29 laterally over the end 37 of the leg 36.

In the operation of the releaser 1, the releaser 1 may be connected into a suitable milking system, such as, for example, the milking system shown in part in FIG. 4, for receiving milk from the receiver 2 and dumping the milk at a receiving station A. In the milking system shown in FIG. 4, the upper end of the receiver 2 may be connected to a suitable vacuum line 38 which is connected to a suitable source of vacuum, not shown. The intermediate portion of the receiver 2 is connected to one end of a suitable milk flow line 39, the other end portion of which may be connected to a suitable source of milk, such as, for example, the udders of a cow.

It will be remembered that the bottom of the receiver 2 is connected by the milk line 19 to the tubular member 13, whereby milk received in the receiver 2 may flow through the line 19 and the tubular member 13 into the inlet conduit 8 and thereby into the neck 7 and the body portion 5 of the releaser 1. The interior of the vessel 4 of the releaser 1 is connected by the coupling 10, and the vacuum line 11 to the pulsator 3. The pulsator 3 may be any suitable type of pulsator readily available on the market, and includes an air inlet, such as the air inlet 40 illustrated diagrammatically in FIG. 4. The pulsator 3 is also connected to one end of a vacuum line 41, the other end of which is connected to the aforementioned suitable source of vacuum, not shown.

The pulsator 3 is operable to alternately connect the conduit 11 to the vacuum line 41 and the air inlet 40, to thereby alternately withdraw air from, and permit atmospheric air to flow into, the vessel 4, respectively. The vacuum in the lines 38 and 41 may be any suitable amount such as, for example, fifteen inches of mercury. Also, the cycle of operation of the pulsator 3 may be of any suitable length, such as, for example, a cycle wherein the line 11, and, therefore, the vessel 4 is evacuated for fourteen seconds, and is then submitted to atmospheric air for five seconds.

It will be understood that throughout the operation of the apparatus shown in FIG. 4, the line 38, and, therefore, the receiver 2 and the lines 19 and 39 are constantly under vacuum. Under these conditions, when the releaser 1 is connected through the conduit 11 and the pulsator 3 to the vacuum line 41, so as to draw a vacuum in the vessel 4, the weight 31 and the atmospheric air pressing against the outer face of the flapper valve 28 is effective to firmly seat the valve 28 against the valve seat 27, to thereby tightly close the opening 26 in the body portion 5. At this same time, the air pressure on the opposite faces of the flapper valve 22 is equalized so that the weight of the milk in the line 19 and the receiver 2 is effective to open the flapper valve 22 and permit the milk to flow from the receiver 2 through the line 19, the tubular member 13, and the inlet conduit 8 into the neck 7 and, therefore, into the body portion 5 of the vessel 4.

It will be noted that the inlet conduit 8 is so constituted and arranged in the vessel 4, and the tubular member 13 is so constituted and arranged in the inlet conduit 8, that the path of travel of the milk into and through the inlet conduit 8 is spaced downwardly from the connecting nipple 10 a distance sufficient to insure that no milk or milk spray is drawn upwardly through the nipple 10 into the vacuum line 11. Also, it will be seen that with the flapper valve 22 constituted and arranged in the vessel 4 in the manner shown in FIG. 1, it is disposed, in all positions thereof, between the milk in the inlet conduit 8 and the nipple 10 to thereby act as a deflector plate effective to deflect the milk downwardly away from the nipple 10.

At the end of the aforementioned releaser-filling operation, the pulsator 3 disconnects the line 11 from the vacuum line 41, and connects it to the atmospheric air inlet 40. The admission of atmospheric air into the vessel 4 is effective to snap the flapper valve 22 shut into sealing engagement with the valve seat 23 to thereby retain the vacuum in the line 19 and the remainder of the milking system connected to the end thereof remote from the releaser 1. Also, the admission of atmospheric air into the vessel 4 above the supply of milk therein, is effective to balance the pressure of the air on the inside and outside of the flapper valve 28, so that the weight of the milk in the vessel 4 is effective to move the flapper valve 28 downwardly into opened position relative to the valve seat 27, and permit the milk in the vessel 4 to be dumped therefrom through the opening 26 in the bottom thereof. After the milk has been discharged from the vessel 4, the counterbalancing weight 31 is effective to move the flapper valve 28 back to sealing engagement with the valve seat 27, and when the pulsator 3 again causes the vessel 4 to be evacuated, the flapper valve 28 is again firmly held by the atmospheric air acting on the outer face thereof in tight sealing engagement with the valve seat 27 to thereby firmly close the opening 26. This commences another cycle of operation of the releaser 1. Each of the cycles of operation comprises filling the major portion of the body portion 5 of the vessel 4 with milk, and then dumping the thus accumulated milk outwardly through the opening 26, and such cycles are repeated throughout the operation of the milking system shown in FIG. 4.

In the releaser 1 shown in the drawings, the body portion 5 is of substantially greater cross-sectional size than the neck 7, and is of substantially greater volumetric capacity. With this construction, a substantial volume of milk may be accumulated in the body portion 5 of the vessel 4 prior to the dumping thereof, and the volume of air above upper level of the milk thus accumulated in the vessel 4, and which must be alternately evacuated and replaced in the operation of the releaser 1, is relatively small.

Also, it will be seen that the novel releaser 1 shown in the drawings is so constructed that milk flowing thereinto and therethrough in a normal manner does not come in contact with any rubber parts, the only rubber part embodied in the releaser 1 being the gasket 18, which is disposed outwardly of the normal path of flow of milk from the tubular member 13 into the interior of the vessel 4.

In addition, it will be seen that when it is desired to clean the interior of the vessel 4, the flapper valve 28 may be readily removed from the body portion, 5, by lifting the entire flapper valve assembly 28–29–31 off from the mounting bracket 34, to thereby leave the opening 26 completely unobstructed, so that, if desired, the person cleaning the interior of the vessel 4 may insert his hand thereinto through the opening 26. With the parts of the vessel 4 constituted and arranged in the manner disclosed herein, all parts thereof are readily accessible to the fingers of a hand inserted through the opening 26, so that all such parts may be readily manually washed or wiped, if such is desired.

Also, it will be seen that in the novel releaser 1 the tubular member 13 and the flapper valve 22 may be readily removed from the vessel 4 as a single unit, by releasing the clamping ring 17 and withdrawing the tubular member 13 from the inlet conduit 8. Thus, the tubular member 13 and the flapper valve 22 may be separately washed and sterilized, if desired, and the operator has ready access to the interior of the vessel 4 through the inlet conduit 8, if such is desired.

From the foregoing it will be seen that the present invention affords a novel releaser which is relatively small and compact in size, particularly, in a vertical direction, while affording a relatively large volumetric capacity for the reception of milk.

Also, it will be seen that the present invention affords a novel releaser which may be quickly and easily cleaned.

In addition, it will be seen that the present invention affords a novel releaser which is practical and efficient in operation and which may be readily and economically produced commercially.

Thus, while we have illustrated and described the perferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A releaser for a milking system
   (a) a vessel having
      (1) a body portion rounded in all directions
      (2) an elongated substantially cylindrical-shaped neck of smaller transverse cross sectional size than said body portion projecting upwardly from the top of said body portion, and
      (3) a tubular conduit
         (a') connected at one end into said neck in downwardly spaced relation to the top of said neck, and
         (b') projecting substantially horizontally outwardly from said neck,
   (b) a mounting bracket in said conduit
   (c) means for feeding milk into said conduit for passage therethrough into said neck and body portion,
   (d) a flapper valve removably hooked onto said bracket for movement between a closed position effective to open said means and permit said passage of said milk into said conduit, and an open position effective to opend said means and permit said passage of said milk through said conduit,
   (e) said body portion having a downwardly opening passageway in the bottom thereof for discharging said milk from said vessel,
   (f) another flapper valve pivotally mounted on said body member for movement between
      (1) a raised closed position effective to close said passageway, and
      (2) a lowered open position effective to open said passageway, and
   (g) a coupling member mounted on the upper end portion of said neck above and horizontally spaced from said conduit for connecting the interior of said neck and said body portion to means for alternately admitting and withdrawing air into and from said vessel and thereby alternately
      (1) closing said first-mentioned flapper valve and opening said other flapper valve to thereby discharge said milk from said body portion, and
      (2) opening said first-mentioned flapper valve and closing said other flapper valve to thereby feed said milk into said body portion, respectively.
2. A releaser as defined in claim 1, and in which
   (a) said flapper valves are biased by gravity toward closed position, and
   (b) said first-mentioned flapper valve, when disposed in said open position, is disposed in said conduit in position to deflect milk entering said neck through said conduit downwardly away from said coupling member.
3. A releaser as defined in claim 1, and in which
   (a) said passageway is sufficiently large in cross-sectional size as to permit the insertion of an adult human hand into said body portion, and
   (b) said other flapper valve includes a flexible sheet metal member movable into and out of closing relation to said passageway.
4. A releaser as defined in claim 1, and
   (a) which includes
      (1) a hook mounted in said conduit and projecting toward said neck, and
   (b) in which
      (1) said fiirst-mentioned flapper valve is removably mounted on said hook for pivotal movement between said open and closed positions thereof, and
      (2) said passageway, said body portion, and said neck are of sufficient cross-sectional size as to permit the insertion of an adult human hand through said paassageway into position in said body portion to permit the insertion of fingers of said hand through said neck into said conduit.
5. A releaser as defined in claim 1, and
   (a) which includes another conduit removably mounted in said first-mentioned conduit for feeding said milk into said first-mentioned conduit, and
   (b) in which said first-mentioned flapper valve is disposed in sealing engagement with said other conduit in position to close the latter when said first-mentioned flapper valve is disposed in said closed position therefor.
6. A releaser as defined in claim 5, and in which
   (a) said first-mentioned conduit is of sufficiently large cross-sectional size as to permit, when said other conduit is removed therefrom,
      (1) the insertion and removal of said first-mentioned flapper valve into and out of operative position in said first-mentioned conduit through either end of the latter, and
      (2) the insertion of fingers of an adult hand into said first-mentioned conduit from either end thereof.
7. A releaser as defined in claim 1, and in which
   (a) said body portion is substantially the shape of a spheroid which is truncated at the top and the bottom.
8. A releaser as defined in claim 1, and in which
   (a) said other flapper valve includes a flexible sheet metal member movable into and out of closing relation to said passageway.

References Cited by the Examiner

UNITED STATES PATENTS

| | | | |
|---|---|---|---|
| 1,332,318 | 3/20 | Bower | 119—14.07 |
| 2,630,783 | 3/53 | Reeve | 119—14.07 |
| 2,786,445 | 3/57 | Golay | 119—14.07 |
| 2,805,643 | 9/57 | Hill | 119—14.07 |
| 2,871,821 | 2/59 | Golay | 119—14.07 |

SAMUEL KOREN, *Primary Examiner.*

HUGH R. CHAMBLEE, *Examiner.*

UNITED STATES PATENT OFFICE
CERTIFICATE OF CORRECTION

Patent No. 3,195,504                      July 20, 1965

Joseph Sampson et al.

It is hereby certified that error appears in the above numbered patent requiring correction and that the said Letters Patent should read as corrected below.

Column 2, lines 29 to 32, strike out "Another disadvantage commonly found in releasers for milk systems, and the like, milk, or milk spray will not be drawn from the releaser into the vacuum line of the system."; column 7, line 24, for "open said means and permit" read -- close said means and prevent --; line 26, for "opend" read -- open --.

Signed and sealed this 13th day of December 1966.

(SEAL)
Attest:

ERNEST W. SWIDER                      EDWARD J. BRENNER
Attesting Officer                        Commissioner of Patents